Sept. 15, 1936.   H. F. FISHER   2,054,075
PROCESS AND APPARATUS FOR DEWAXING OIL
Filed Dec. 26, 1933
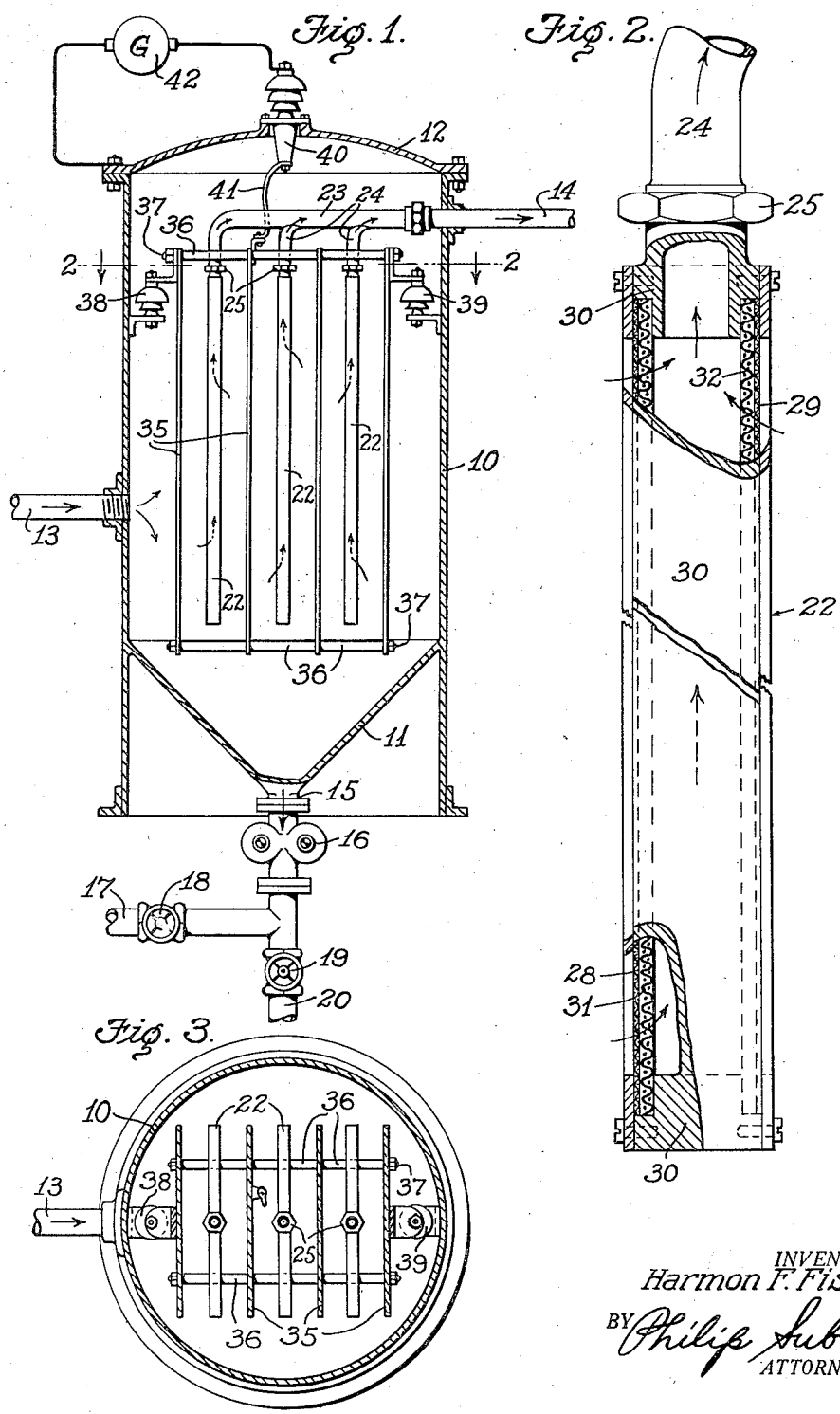
INVENTOR.
Harmon F. Fisher
BY Philip Subkow
ATTORNEY.

Patented Sept. 15, 1936

2,054,075

UNITED STATES PATENT OFFICE 2,054,075

PROCESS AND APPARATUS FOR DEWAXING OIL

Harmon F. Fisher, Los Angeles, Calif., assignor to Union Oil Company of California, Los Angeles, Calif., a corporation of California Application December 26, 1933, Serial No. 703,887

7 Claims. (Cl. 204—24)

This invention relates to the separation of wax from wax-bearing oil. It relates more particularly to the separation of suspensions of precipitated wax from oil by means of filtration and by means of combined filtration and electrical treating.

In the separation of wax from wax-bearing oils by conventional filtration methods, the wax-bearing oil is chilled in the presence of a suitable diluent to a temperature at which the wax is precipitated from solution in the oil in the form of a finely divided suspension of wax particles or crystals. The wax thus forming the suspended precipitate is then subsequently removed from the oil by passing the mixture through a suitable filter where the wax is collected upon the filter surfaces and through which the wax-free oil is withdrawn.

It is necessary to remove the wax layer or cake which accumulates on the filter surfaces after relatively short periods of operation, in order to maintain the filter in operation. In the ordinary type of closed filter it is necessary, therefore, at regular periods to stop the flow through the filter, withdraw the oil, open the filter and mechanically dislodge or wash the said wax accumulations from the filter surfaces. This necessitates intermittent operation which is time consuming.

It is desirable, therefore, from the point of efficiency to prolong the periods of operation, between wax removals, to as great a length of time as possible.

It is, therefore, an object of this invention to improve filtering operations by increasing the efficiency and thoroughness of removal of precipitated wax from oil, and by prolonging the duration of filtering cycles between periods of wax removal and filter reconditioning.

The objects of this invention are accomplished in general by employing simultaneous electrical treating and filtering of the wax-bearing oil.

The invention is embodied in apparatus comprising a plate or leaf filter body adapted to operate as one electrode and a second electrode positioned adjacent to said filter body whereby an electric field may be established between the said filter body and the said second electrode and whereby wax-bearing oil approaching and entering the filter body may be at the same time subjected to an electric field. The polarity of the electric field between the filter body and the adjacent electrode is preferably maintained so that the wax particles in the oil approaching the filter are repelled from the filter surface and attracted by the second electrode, resulting in a decreased amount of wax being collected upon the said filter surface in a given period of time.

The invention broadly stated comprises a process and apparatus for removing wax from wax-bearing oil wherein the wax-bearing oil is passed through a filter while being subjected to an electric field. The invention more specifically stated comprises a process and apparatus for removing wax from wax-bearing oil wherein the oil containing precipitated wax is subjected to an electric field between oppositely charged electrodes and wherein one of said electrodes comprises a filter surface through which oil containing precipitated wax while being subjected to said electric field, passes.

The accompanying drawing illustrates one embodiment of the invention in which Figure 1 is a sectional elevation through the filter unit, Figure 2 is a plan section taken on line 2—2 of Figure 1, and Figure 3 is a cross-section through one of the filter leaves contained in the unit.

The filter unit comprises a tank or cylinder 10 having a conical bottom 11 and a spherical surfaced head 12 with a feed inlet connection 13, a filtrate outlet connection 14 and a bottom drain 15 connecting with pump 16 and lines 17 and 20 through which unfiltered oil and wax respectively are removed from the tank. An electric lead-in insulator 40 is situated in the top of the head 12 through which electrical connection is maintained with electrodes inside of the unit.

A number of filter elements 22 are supported centrally within the tank 10 by means of the pipe manifolding 23 and the filtrate outlet line 14. The said filter elements 22 are suspended from the manifold 23 by means of branch connections 24 and unions 25. The filter elements 22 each comprise two rectangular filter leaves 28 and 29 supported at the edges by and in liquid-tight contact with a rectangular metallic frame 10. The leaves 28 and 29 may be composed of an outer sheet of a closely woven canvas or other suitable filtering material attached at the edges to the said rectangular frame 30 and supported on the inside against external pressure by means of metallic screens or wire mesh 31 and 32 which are also attached at the edges to the frame 30. The filter elements 22 thus form a hollow rectangular structure into which liquid to be filtered can penetrate only by passing through the said filter surfaces 28 and 29. Branch connections 24 and unions 25 centrally located on the top edges of the rectangular metallic frames 30 form the outlets for the filtrate from the inside of the filter elements.

A number of rectangular plate electrodes 35 are positioned within the filter unit so that the surfaces are adjacent to and equally spaced at all points from the surfaces of the hereinbefore described filter leaves carried by the filter elements 22. These electrodes 35 are mechanically tied together to form a rigid unit by means of spacers 36 and tie bolts 37. The electrode unit as a whole is supported by and insulated from the filter tank wall near the top thereof by means of suitable insulators 38 and 39.

Electrical connection is maintained from the outside of the unit to the electrodes through lead-in insulator bushing 40 and a flexible conductor 41. A high electrical potential difference is maintained between the electrodes 35 and filter elements 22 by means of a generator 42.

The operation is as follows: Chilled wax-bearing oil in the presence of a suitable diluent containing precipitated wax is introduced into the filter unit 10 through inlet 13. The treater unit 10 is thus filled with the mixture containing precipitated wax and a sufficient differential pressure is maintained between the said mixture in the unit 10 and the interior of the filter elements 22 communicating with the filtrate outlet 14 to force the oil and diluent solution through the filter leaves 28 and 29. As the said oil and diluent solution flows through the filter leaves the precipitated wax portion of the mixture is disposed in a layer or cake on the outside surface thereof. As the filtrate from which the wax has been thus separated by filtration is withdrawn through the filtrate outlet 14 an equal volume of unfiltered wax-bearing mixture is supplied to the unit through the feed 13.

During the hereinbefore described filtering operation a high potential electric field is maintained through the waxy mixture approaching the filter surfaces between the electrodes 35 and the filter elements 22. It has been found that the wax particles in most oil solutions containing precipitated wax are negatively charged, therefore, by maintaining the electrodes 35 positively charged it has been found that the wax precipitate will tend to move away from the negatively charged filter elements 22 toward the electrode 35 and thus a large proportion of the precipitated wax is prevented from coming in contact with the filter leaves. In this manner, under the influence of an electric field, the quantity of wax deposited in the form of a layer or wax cake on the filter leaves during a given period of time is substantially reduced and thereby extends the effective period of time of filtering operations.

It has been found that that portion of the wax precipitate which reaches the surfaces of the filter leaves while under the influence of an electric field, is agglomerated or altered to a form which is more readily and efficiently filtered.

At the end of each filtering cycle when the wax deposit or cake has formed to such an extent that continued filtration is no longer practicable, the flow of wax-bearing oil containing precipitated wax to the treater unit, is cut off, the oil remaining within the unit 10 withdrawn by means of pump 16 and returned through line 17 and valve 18 to the waxy-oil supply system, and the wax allowed to fall from the electrode and filter surfaces into the conical bottom 11 below. After the oil has been withdrawn from the unit 10 and the wax from the electrode and filter surfaces has accumulated in the conical bottom 11, valve 18 is closed and valve 19 is opened and the said wax accumulation expelled by means of pump 16 through line 20.

The wax cake may be removed from the filter surfaces by any one of a number of well known processes, such as "flapping" the filter leaves. "Flapping" of the filter leaves is accomplished by a more or less rapid reversal of differential pressure thereon, causing the filter leaves which are quite flexible to bulge first inwardly and then outwardly and thus to dislodge wax accumulations from their surface. The wax may be removed from the electrodes 35 by any suitable mechanical means but it has been found that generally the wax falls from the electrode surfaces after the support of the surrounding body of waxy oil is withdrawn.

The temperature of the wax-bearing oil-diluent solution containing precipitated wax entering the treater unit 10 through the inlet 13 is ordinarily maintained between —20° F. and —40° F. depending upon the pour point desired in the finished product. Precipitation of the wax in the wax-bearing oil-diluent solution at these temperatures may be accomplished by "shock chilling" or "batch chilling" in a separate chilling chamber not illustrated in the drawing. It has been found that "shock chilled" wax-bearing oil may be advantageously filtered and electrically treated according to the process of operation described herein.

A potential gradient of from 30,000 to 75,000 volts per inch maintained between the electrodes 35 and the surface of the filter elements 22 has been found effective. This potential is supplied by any suitable means, such as a high potential direct current generator 42 capable of supplying intermittent or continuous uni-directional current. Ordinarily the electrodes 35 are maintained at a positive polarity with respect to the filter elements 22 where the precipitated wax particles are of a negative polarity but where the polarity of the wax particles is found to be of different polarity, the polarities of the electrodes may obviously be reversed.

This filter may be operated under vacuum according to common methods of vacuum filtration or it may be operated under any suitable pressure providing only that sufficient differential is maintained through the filter leaves.

The process and apparatus is not limited to the specific structure nor to the treatment of oil for the removal of wax but they are applicable to the treatment of similar substances for the removal of asphalt, asphaltines, petrolatum, sludges, finely divided solids and other substances and impurities both solid and plastic.

The foregoing is merely illustrative of one apparatus and process of the invention and is not limited thereby but may include any process and apparatus which accomplishes the same within the scope of the invention.

I claim:

1. Apparatus for dewaxing oil comprising a tank, a filter surface in said tank, an electrode surface in said tank adjacent said filter surface, means to introduce oil containing precipitated wax into said tank, means to produce an electric field between said electrode surface and said filter surface, means to flow the oil containing precipitated wax in said tank into the said electric field, means to withdraw oil from said tank through said filter surface means to dislodge wax from said filter surface and means to withdraw wax from the lower portion of said tank.

2. Apparatus for dewaxing oil comprising a filter body, an electrode adjacent said filter body, means to pass oil containing precipitated wax in suspension between said electrode and the filter body, and through the said filter body, means to charge said electrode to an electric potential with respect to said filter body and at opposite polarity to that inherently possessed by the wax precipitate particles, whereby wax precipitate is retarded with respect to the oil in movement towards the said filter body, means for dislodging such wax precipitate as does deposit on said filter body and means for withdrawing wax at a point below said filter body.

3. A process for dewaxing oil comprising filtering oil containing precipitated wax in suspension, and simultaneously retardng the motion of the said wax precipitate relative to the oil approaching the filter by subjecting the mixture to an electric field.

4. A process for dewaxing oil comprising filtering chilled oil containing solidified wax particles in suspension, subjecting the mixture approaching the filter surface to an electric field from an adjacent electrode charged to an electric potential with respect to said filter surface and at a polarity opposite to that inherently possessed by the wax precipitate particles, whereby said wax precipitate will be attracted by said electrode and retarded, with respect to the oil, in movement towards the filter surface.

5. A process for dewaxing oil comprising filtering chilled oil containing solid wax in suspension, subjecting the mixture approaching the filter surface to an electric field from an electrode adjacent to said filter surface and depositing a portion of the wax on said electrode.

6. A process for the separation of wax from wax-bearing oil which comprises precipitating wax in the wax-bearing oil, subjecting the precipitated wax-oil mixture to the influence of an electric field and thereby converting the wax into a form which is more readily filterable in character and simultaneously withdrawing wax-freed oil through a filter under the influence of said electric field while maintaining the polarity of said filter such that the wax particles tend to be repelled from the filter surface.

7. A process for the separation of wax from wax-bearing oil which comprises dissolving the wax-bearing oil in a diluent, chilling the solution to precipitate wax, subjecting the precipitated wax-oil mixture to the influence of an electric field and thereby converting the wax to a form which is more readily filterable in character and withdrawing wax-freed oil through a filter under the influence of said electric field while maintaining the polarity of said filter such that wax particles tend to be repelled from the filter surface.

HARMON F. FISHER.